United States Patent [19]

Kreier et al.

[11] Patent Number: 5,790,040
[45] Date of Patent: Aug. 4, 1998

[54] BATTERY-OPERATED SECURITY SYSTEM SENSORS

[75] Inventors: James Kreier, Amery, Wis.; Keith D. Kuhnly, Lino Lakes, Minn.

[73] Assignee: Interactive Technologies, Inc., North St. Paul, Minn.

[21] Appl. No.: 766,807

[22] Filed: Dec. 13, 1996

[51] Int. Cl.$^6$ .................................................. G08B 23/00
[52] U.S. Cl. ........................ 340/693; 340/567; 340/506; 340/565; 340/541; 250/222.1; 250/353; 362/394; 362/276
[58] Field of Search .................................... 340/693, 567, 340/555, 506, 521, 565, 556, 522, 541, 552–554; 250/222.1, 221, 353, 342, 347, 349; 362/394, 276, 802, 395

[56] References Cited

U.S. PATENT DOCUMENTS

| | | |
|---|---|---|
| Re. 32,828 | 1/1989 | Mudge . |
| 2,810,902 | 10/1957 | Crossley . |
| 2,976,419 | 3/1961 | Menke et al. . |
| 3,017,513 | 1/1962 | Messelt . |
| 3,444,739 | 5/1969 | Treharne . |
| 3,560,950 | 2/1971 | Peters . |
| 4,005,605 | 2/1977 | Michael . |
| 4,045,670 | 8/1977 | Anderson et al. . |
| 4,364,030 | 12/1982 | Rossin . |
| 4,494,881 | 1/1985 | Everest . |
| 4,514,630 | 4/1985 | Takahashi et al. . |
| 4,604,524 | 8/1986 | Kotlicki et al. ............ 250/342 |
| 4,634,294 | 1/1987 | Christol et al. . |
| 4,644,164 | 2/1987 | Mudge . |
| 4,672,206 | 6/1987 | Suzuki et al. . |
| 4,743,122 | 5/1988 | Yamano et al. . |
| 4,899,052 | 2/1990 | Lindquist . |
| 4,907,895 | 3/1990 | Everest . |
| 4,970,494 | 11/1990 | Keely et al. . |
| 4,986,672 | 1/1991 | Beynon ............................ 374/131 |
| 5,015,994 | 5/1991 | Hoberman et al. ............ 340/567 |
| 5,155,474 | 10/1992 | Park et al. . |
| 5,167,235 | 12/1992 | Seacord et al. . |
| 5,281,953 | 1/1994 | Torres et al. . |
| 5,308,985 | 5/1994 | Lee ............................... 250/353 |
| 5,317,620 | 5/1994 | Smith . |
| 5,349,330 | 9/1994 | Diong et al. . |
| 5,422,484 | 6/1995 | Brogi et al. . |
| 5,499,016 | 3/1996 | Pantus ........................... 340/555 |
| 5,557,106 | 9/1996 | Ioco ............................. 250/353 |
| 5,626,417 | 5/1997 | McCavit ........................ 340/567 |

OTHER PUBLICATIONS

Interactive Technologies, Inc., Installation Instructions, Learn Mode (LM) DS–924 Motion Detector (PIR), ITI Part #60–511, Doc. #46–587 Rev. B (undated and Applicants believe it was publicly available prior to Dec. 13, 1995).

Ademco, Installation Instructions, No. 5890: Passive Infrared Motion Detector/Transmitter, May 1994, 4 pages.

Electronic Engineering Ltd., Installation Instructions, Merlin 1011 V1 High–Performance Wireless Passive Infrared Detector (ASIC Technology), (May 1995), 2 pages.

Interactive Technologies, Inc., Product Specification, DS924 Motion Detector PIR, ITI Part #60–511–319.5, 1995, and Applicants believe it was publicly available prior to Dec. 13, 1995.

Interactive Technologies, Inc., Installation Instructions, Passive Infrared Motion Sensor, Part No. 60–184–10–319.5, pp. 1–4, Jun. 1990.

Interactive Technologies, Inc., Installation Instructions, Passive Infrared Motion Sensor, pp. 1–4, May 1991.

*Primary Examiner*—Jeffery Hofsass
*Assistant Examiner*—Nina Tong
*Attorney, Agent, or Firm*—Fish & Richardson, P.C., P.A.

[57] ABSTRACT

A security system sensor has a lens lying in a forward plane that focuses received energy to a focal point that is internal to the sensor. A sensing element is located at or near the focal point of the lens. A funnel-shaped chamber between the lens and the focal point is substantially vacant so that received energy is received by the sensing element. A battery housing is positioned so that the physical volume of a battery power source contained therein is mainly rearward of the lens and the vacant funnel-shaped chamber, yet forward of a plane that is immediately rearward of the sensing element. Also, a dividing barrier, interposed between the chamber and the battery power source, extends to and seals with the sensing element and the lens, thereby providing a seal for the vacant, funnel-shaped chamber.

19 Claims, 7 Drawing Sheets

BATTERY-OPERATED SECURITY SYSTEM SENSORS

FIELD OF THE INVENTION

The invention relates to security system sensors of the type that use, and therefore must house, a local battery source.

BACKGROUND OF THE INVENTION

Home and commercial security systems typically include remote sensors that are in communication with a central control panel. The control panel processes sensed information from the remote sensors and controls security system operation. Information from the remote sensors may be communicated to the control panel either by a hard-wired connection or by radio frequency (RF) transmissions. A security system that communicates by RF transmissions is referred to as a "wireless" security system. An example of a wireless security system is disclosed in U.S. Pat. No. 4,855,713, assigned to the assignee of the present invention, Interactive Technologies, Inc. (ITI), North Saint Paul, Minn.

Wireless sensors are typically larger and more costly than their hard-wired counterparts. Unlike hard-wired sensors, wireless sensors must house an RF transmitter and its associated circuitry, as well as a local battery source that is sufficient to provide the required power. Sensor size and cost has been a factor that has weighed in favor of selecting a hard-wired security system in lieu of a wireless system. In addition, hard-wired sensors also may have a local battery source as backup.

One type of sensor detects changes in infrared radiation, or heat energy, caused, for example, by the body heat of a passing intruder. Such a sensor is referred to as a passive infrared (PIR) sensor. A PIR sensor is typically mounted on a wall, in a corner of a room, or to a ceiling, to detect motion in a protected area.

A PIR sensor has a lens that focuses heat energy rearward toward a focal point and a PIR sensing element internal to the enclosure of the PIR sensor. Various lens choices are available to customize the PIR sensor to meet the requirements of the monitored area, for example, to achieve broad coverage, narrow coverage, or to allow pet movement. One type of PIR sensor lens is a Fresnel lens which is typically rectangular-shaped and bowed about a rearward vertical axis. The PIR sensing element is usually mounted on a printed circuit board (PCB), upon which the wireless sensor circuitry is also mounted.

An internal chamber between the lens and the PIR sensing element is kept substantially vacant to allow heat energy to be directed to the sensing element. It is desirable that this chamber be sealed to reduce undesirable effects caused by air drafts and intruding insects, for example. Some PIR sensors employ side walls that bound the chamber and which are helpful in sealing the chamber.

An example of a wireless PIR sensor currently available is the DS924 motion sensor, made by ITI and Detection Systems, Inc., and sold by ITI under ITI part number 60-511. The size dimensions of this PIR sensor are 3.0" (7.6 cm) wide by 3.75" (9.5 cm) high by 2.5" (6.4 cm) deep. The total volume is therefore 28.13 cubic inches (462 cubic cm). (This volume calculation is a representative calculation based on the three largest representative dimensions.) The DS924 motion sensor uses one 3.5 Volt, ½ AA, lithium thionyl chloride cylindrical-cell battery (for example, the SAFT lithium thionyl chloride 3.5 Volt battery, which is rated at 850 mAH and is approximately ½ inch in diameter and $^{15}/_{16}$ of an inch in length). The battery is mounted in a plastic battery bucket on a rear surface of the DS924's PCB. Mounting the battery in a bucket rearward of the PCB adds to the overall depth dimension of the PIR sensor.

Another example is a wireless PIR sensor manufactured by Crow Electronic Engineering Ltd., Fort Lee, N.J. (U.S.A. office), under the model Merlin 1011 v1. This sensor has housing dimensions of 2.5" (6.36 cm) wide by 3.8" (9.7 cm) high by 2.16" (5.5 cm) deep, giving it a total volume of 20.52 cubic inches (339 cubic cm). The Merlin 1011 v1 uses one 3.6 Volt, ½ AA, lithium thionyl chloride cylindrical-cell battery (for example, the TADIRON™, 900 mAH battery). The battery is mounted on a front surface of the Merlin's PCB, horizontally along the PCB's bottom edge. The battery is not directly rearward of the lens and therefore adds to the overall height dimension of the PIR sensor.

Yet another example is a wireless PIR sensor manufactured by the Ademco Division of Pittway Corp., Syosset, N.Y., under Ademco part number 5890. The Ademco 5890 PIR sensor has housing dimensions of $^{2-11}/_{16}$" (6.8 cm) wide by 5.0" (12.7 cm) long by $^{1-7}/_{8}$" (4.8 cm) deep, giving it a total volume of 25.20 cubic inches (415 cubic cm). The Ademco 5890 PIR sensor uses two 3.0 Volt, CR123A, lithium manganese dioxide cylindrical-cell batteries (for example, the Panasonic CR123A which is rated at 1.8 AH and is approximately $^{5}/_{8}$" in diameter and $^{1-11}/_{32}$" in length). The two batteries are mounted vertically, end-to-end, in plastic battery buckets on a front surface of the Ademco 5890's PCB. One of the batteries is directly rearward of the lens, and a small portion of the battery blocks the area between the lens and the PIR sensing element. The other battery is not mounted directly rearward of the lens but instead is below an area directly rearward of the lens, and as such, adds to the overall height dimension of the PIR sensor.

Batteries pose trade-offs in the design of PIR sensors. First, lithium thionyl chloride batteries are smaller in physical size compared to similarly rated alkaline and lithium manganese oxide batteries. However, for safety reasons, the Underwriters Laboratory (UL) does not permit end-user replacement of lithium thionyl chloride batteries, which forces an end user to go through a security system dealer to obtain replacement batteries. Second, alkaline batteries are much less expensive than either of the previously mentioned lithium batteries, the lithium manganese oxide batteries and the lithium thionyl chloride batteries. However, alkaline batteries have a worse self-discharge rate of approximately five percent per year, compared to only approximately one percent per year for lithium batteries. Alkaline batteries also do not perform well in cold temperatures.

A general object of the invention is to provide a battery-operated security system sensor that is smaller in size, in order to be less conspicuous, for aesthetic reasons and so that it is not noticed by an intruder. Another object is to utilize larger, and perhaps user-replaceable, batteries, while still minimizing the size of the sensor. Another object of the invention is to provide the means to seal the vacant funnel-shaped chamber between the lens and the sensing element.

SUMMARY OF THE INVENTION

In general, the invention is directed toward improvements in battery-operated security system sensors. A sensor in accordance with an aspect of the invention has a lens lying in a forward plane that focuses received energy to a focal point that is internal to the sensor. A sensing element is located at or near the focal point of the lens. A funnel-shaped chamber between the lens and the focal point is substantially vacant so that received energy is received by the sensing element. A battery housing is positioned so that the physical volume of the battery power source is mainly rearward of the lens and the vacant funnel-shaped chamber, yet forward of a plane that is immediately rearward of the sensing element.

Battery placement in accordance with the invention utilizes space that has not before been efficiently utilized in a battery-operated security system sensor. Therefore, the invention helps to reduce the size of battery-operated security system sensors. The invention is particularly useful in the design of PIR sensors. In one embodiment, the battery housing is sized to accommodate two AA-sized, and perhaps user-replaceable, batteries in various electrical configurations.

In another aspect of the invention, a means for sealing the vacant funnel-shaped chamber is provided. A dividing wall is interposed between the chamber and the battery power source. The dividing wall extends to and seals with the sensing element and the lens, thereby sealing the chamber to reduce undesirable effects caused by air drafts and intruding insects, for example.

DESCRIPTION OF THE PREFERRED EMBODIMENTS

Figure 1:
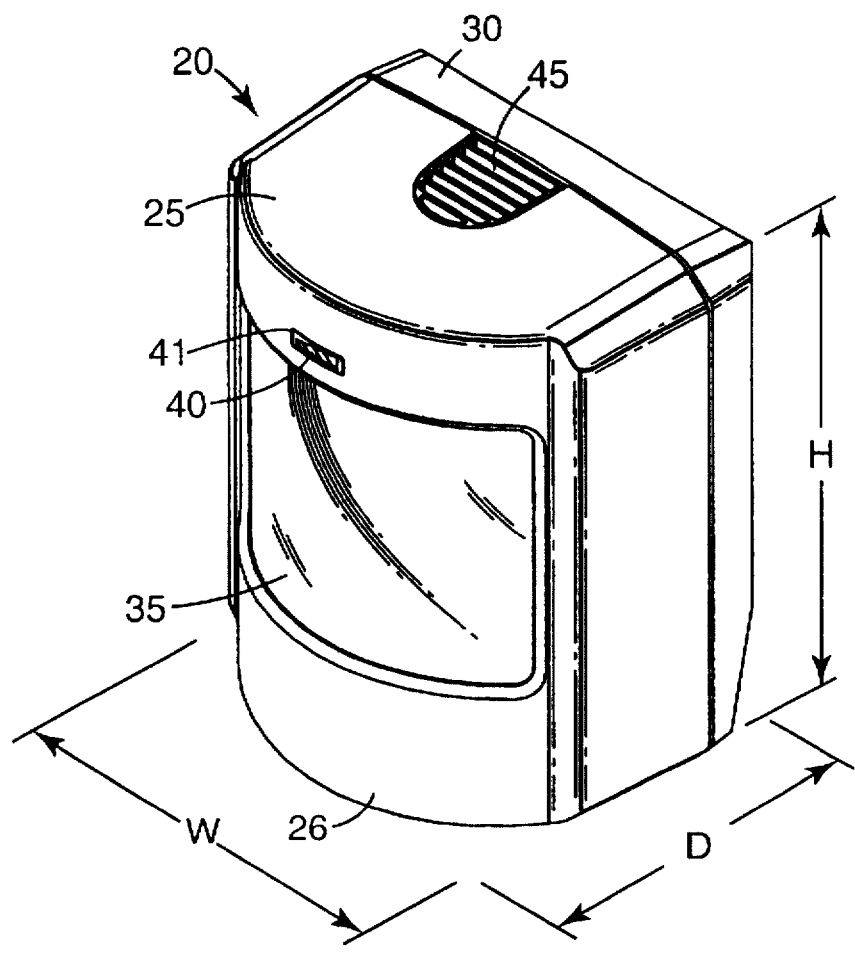
FIG. 1 is a perspective view of a PIR sensor in accordance with the present invention.

A passive infrared (PIR) sensor 20 in accordance with the invention, shown in FIG. 1, includes a front cover 25 having a front surface 26 that is bowed outward; a rectangular-shaped Fresnel lens 35 designed to fit into a rectangular-shaped opening in the front cover 25 so that the Fresnel lens 35 also bows outward; and a back mounting plate 30. A disconnect button 45 allows for the removal, from the back mounting plate 30, of the remainder of the PIR sensor 20.

The Fresnel lens 35 is made of flexible plastic and snaps into position on an inside surface of the front cover 25, completely covering the opening in the front cover 25. The Fresnel lens 35 is selected to achieve the desired coverage and to ensure that PIR energy is directed internal to the PIR sensor 20 to a PIR sensing element (not shown in FIG. 1) located at the focal point of the Fresnel lens 35.

The front cover 25 also has an indicator opening 41. A light pipe 40 protrudes through the indicator opening 41 and shows the state of an internal light-emitting diode (LED) (not shown in FIG. 1). The LED being "on" indicates that the PIR sensor 20 is sensing motion. The LED is activated during installation so the installer can determine that the desired coverage is achieved. Thereafter, the LED is deactivated so that the LED does not drain the battery, and also so that the LED does not alert intruders that their presence has been detected.

The dimensions of the PIR sensor 20 are approximately 2.4" (6.1 cm) wide (W) by 2.9" (7.4 cm) high (H) by 1.9" (4.8 cm) deep (D), which yields a total volume of 13.2 cubic inches (217 cubic cm). (As with the calculations in the background section above, this volume calculation is a representative calculation based on the three largest representative dimensions.) The PIR sensor 20 in accordance with the invention is therefore significantly smaller than any known wireless PIR sensor.

Figure 2:
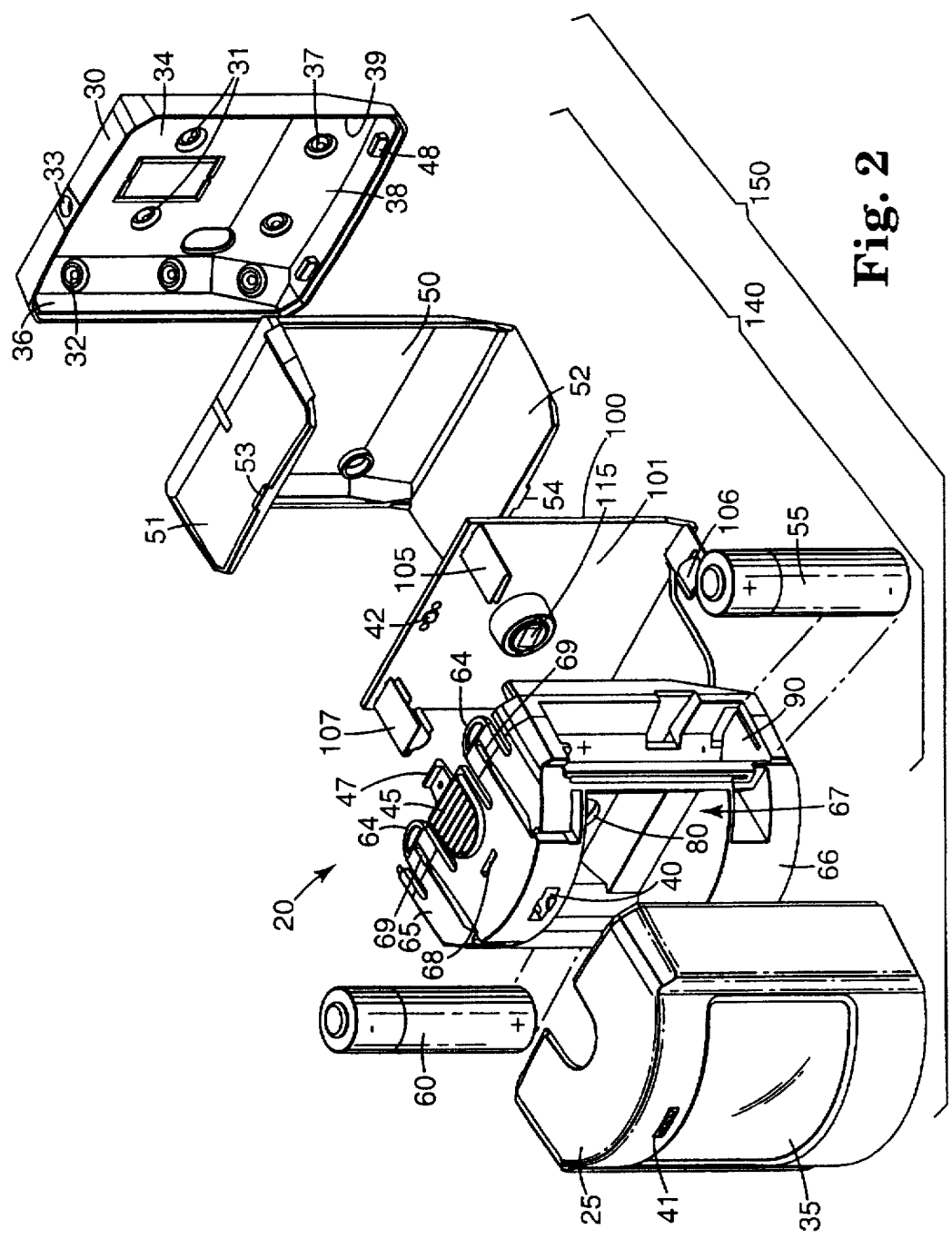
FIG. 2 is an exploded view of the PIR sensor shown in FIG. 1.

FIG. 2 is an exploded view showing the components that make up the PIR sensor 20 of FIG. 1. Interposed between the front cover 25 and the back mounting plate 30 is a sub-chassis 65 into which two AA-sized batteries 55 and 60 are housed; a PCB assembly 100; and a cover 50 for the PCB assembly 100. The front cover 25, sub-chassis 65, PCB assembly cover 50 and back mounting plate 30 are made of any suitable plastic material (for example, acrylic butanate styrene (ABS)) by an injection molding process.

Figure 3:
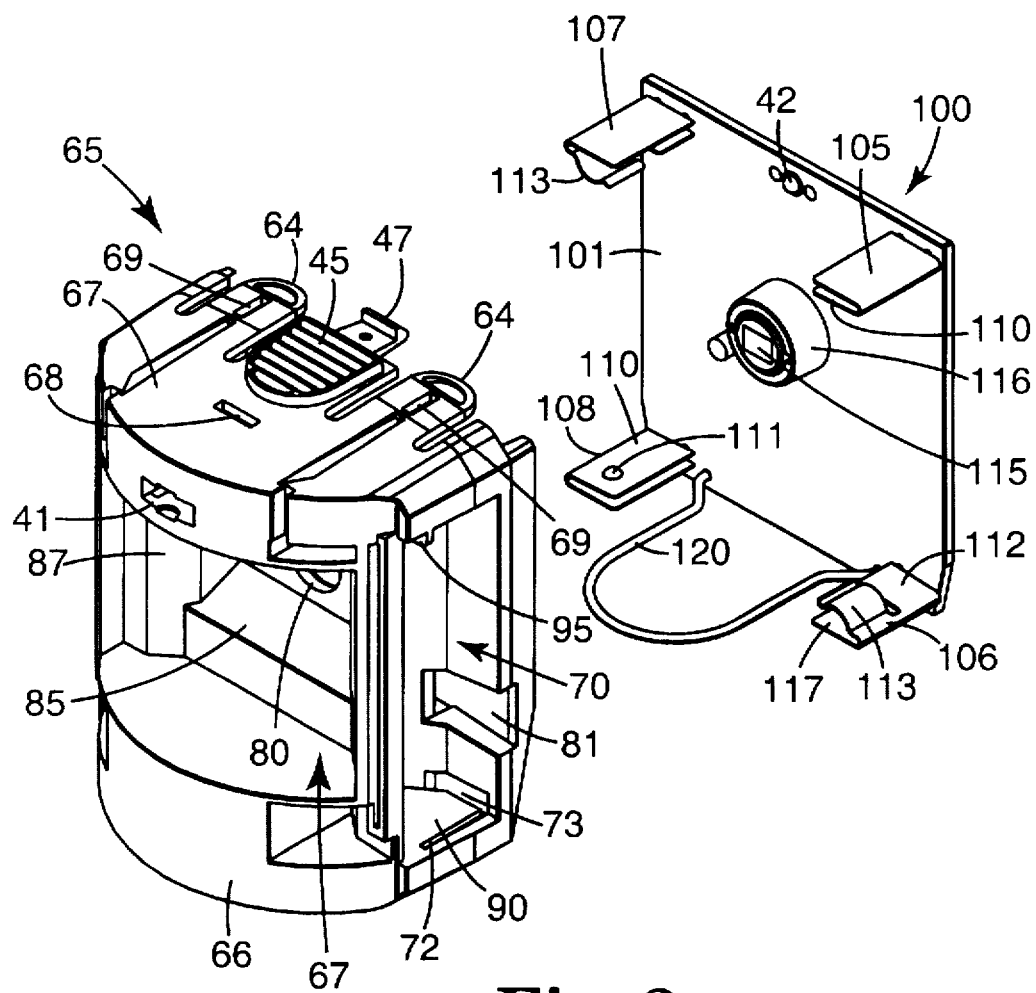
FIG. 3 is a perspective view of a sub-chassis and a printed circuit board (PCB) assembly of the PIR sensor shown in FIG. 1.

The PCB assembly 100, shown in more detail in FIG. 3, has two sets of battery contacts 105, 106, 107 and 108. Each of the battery contacts 105, 106, 107 and 108 is soldered to a forward surface of a PCB 101 and extends forward of the PCB 101. The forwardly extending battery contacts 105, 106, 107 and 108 slide into the sub-chassis 65, as indicated by the dashed lines in FIG. 3.

A PIR sensing element 115 is also mounted on the forward surface of the PCB 101. When the PCB assembly 100 is combined with the sub-chassis 65, an opening 80 in the sub-chassis 80 provides for the access of focused PIR energy to the PIR sensing element 115. The PIR sensing element 115 rests on a housing such that a forward surface of the PIR sensing element 115 is about ¼ of an inch forward of the surface of the PCB 101. Elevation of the PIR sensing element 115 from the PCB 101 prevents damage from occurring to the PIR sensing element 115 when soldering is performed during manufacture. A gasket 116 encircles and extends under the PIR sensing element 115. The gasket 116 helps to isolate the PIR sensing element 115 from the surface of the PCB 101. The gasket 116 also forms a seal with the sub-chassis 65 when the PCB assembly 100 is combined with the sub-chassis 65.

Referring back to FIG. 2, the PCB assembly cover 50 has a height dimension that is larger than that of the PCB assembly 100, but small enough to allow an upper latch 51 and a lower latch 52 to extend around the PCB assembly 100 yet inside the sub-chassis 65. The PCB assembly cover 50 slides into and latches with the sub-chassis 65 to form a chamber that encompasses and protects the PCB assembly 100. An outwardly extending tab 53 on the upper latch 51 mates with an opening 68 in an upper, internal surface of the sub-chassis 65. The tab 53 snaps into the opening 68 to secure the PCB assembly cover 50 to the sub-chassis 65. A similarly functioning outwardly extending tab 54 is on the lower tongue 52 and snaps into place with a hole (not shown) in a bottom, internal surface of the sub-chassis 65. The sub-chassis 65, PCB assembly 100 and PCB assembly back cover 50 combine to form what will be referred to as a primary internal assembly 140.

Referring still to FIG. 2, the primary internal assembly 140 is dimensioned so that it slides into the front cover 25. With the primary internal assembly 140 in place inside the front cover 25, a front surface 66 of the sub-chassis 65 abuts and forms a seal with the perimeter of the internal surface of the Fresnel lens 35. Two catches (not shown) on an upper, internal surface of the front cover 25 are positioned to mate with two holes 69 formed in flexible tab portions 64 of the sub-chassis 65, when the primary internal assembly 140 is in place inside the front cover 25. The two catches snap into the two holes 69 to secure the primary internal assembly 140 to the front cover 25. A similarly functioning catch (not shown) is on a bottom, internal surface of the front cover 25 and is positioned to mate with a similarly functioning hole (not shown) on a flexible tab portion (not shown) on a bottom surface of the sub-chassis 65. The combination of the primary internal assembly 140 with the front cover 25 will be referred to as a primary assembly 150.

To install the PIR sensor 20 in an area to be monitored, the back mounting plate 30 is first secured to a wall or corner of a room with screws or other suitable means. A number of depressed circles 31, 32 and 37 are formed on an inside surface of the back mounting plate 30 and allow for a variety of installation options. The circles 31, 32 and 37 are of sufficient depth to allow an installer to punch out the plastic within the circles 31, 32 and 37 to create holes for the screws. Circles 31 on the back surface 34 allow the PIR sensor 20 to be mounted to a flat surface, such as a wall, and to face perpendicular to the wall. Circles 32 on a surface 36 angled 45 degrees from the back plane, allow the PIR sensor 20 to be installed in a corner and to face perpendicularly. Circles 37 on a slanted surface 38 allow for a "look down" installation configuration against a wall, and additional circles (not shown) positioned as indicated by reference numeral 39 allow for a "look down" installation configuration in a corner. The circles 31, 32 and 37 that are not used for screw holes are not punched out, thereby ensuring a complete protective seal for the inside of the PIR sensor 20.

Once the back mounting plate 30 is secured to a wall or in a corner, the primary assembly 150 is snapped into place with the back mounting plate 30. Two hooks 48 (only one of which is shown in FIG. 2) on the bottom, inside surface of the back mounting plate fit inside two openings 49 (not shown in FIG. 2, but shown in FIGS. 5 and 6) in the bottom surface of the primary assembly 150, and more specifically, in the bottom surface of the sub-chassis 65. After the hooks 48 are positioned into the openings 49, the top half of the primary assembly 150 is inserted into the back mounting plate 30. A flexible tab with a catch 47 is flexed downward when the top half of the primary assembly 150 is inserted into the back mounting plate 30. The catch 47 mates with an opening 33 in a top, internal surface of the back mounting plate 30. The catch 47 snaps into the opening 33 to secure the primary assembly 150 to the back mounting plate 30. To release the catch 47 from the back mounting plate 30, and hence to release the primary assembly 150 from the back mounting plate 30, the button 45 (see also FIG. 1) on the flexible tab is depressed.

Figure 4:
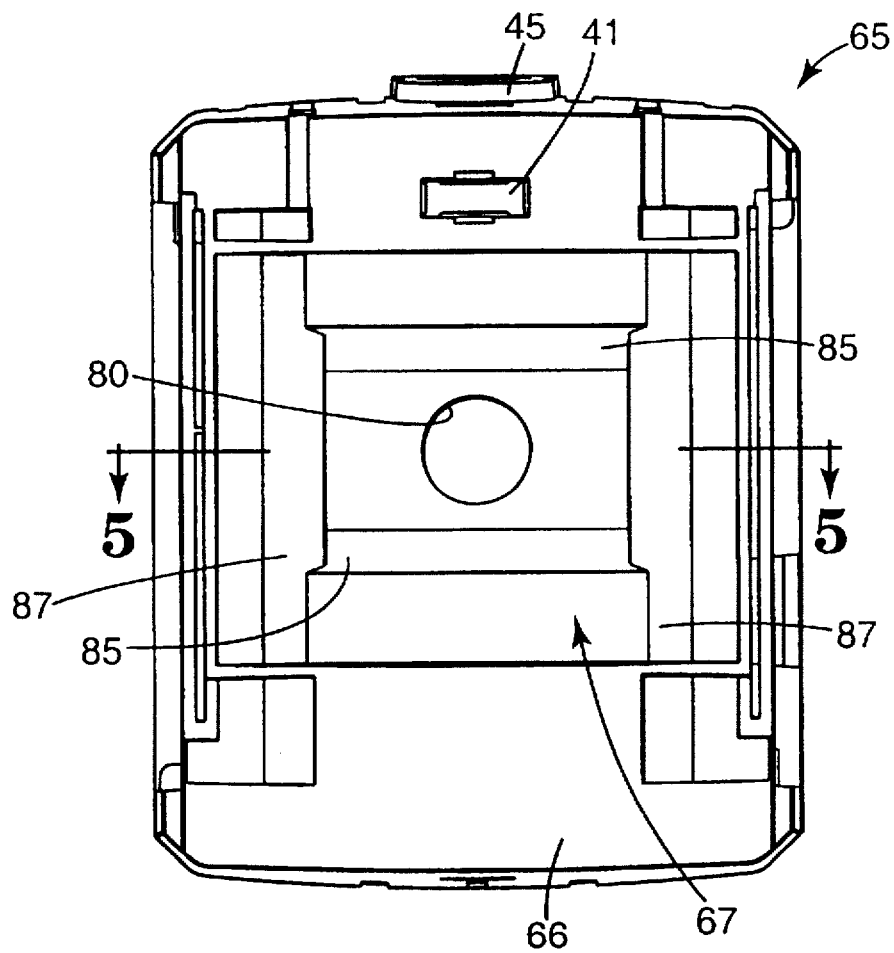
FIG. 4 is a front view of the sub-chassis shown in FIG. 3.
Figure 5:
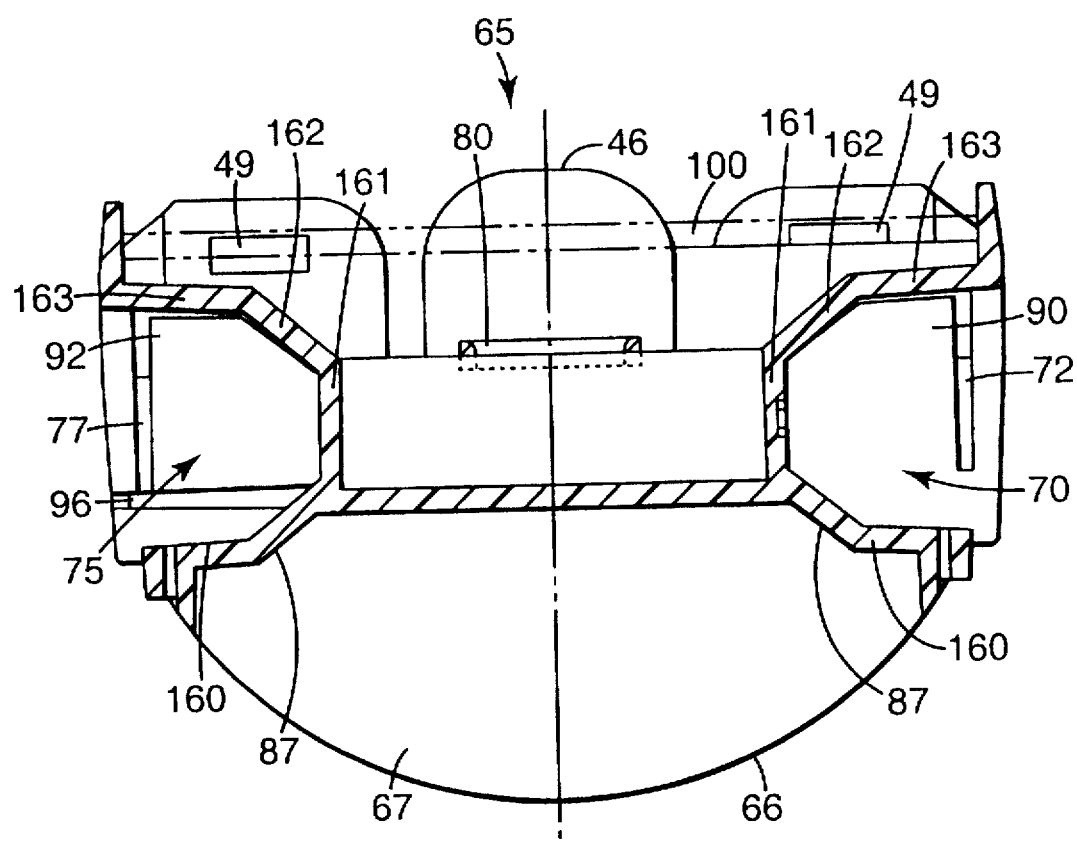
FIG. 5 is a cross-sectional view of the sub-chassis shown in FIG. 4, taken along line 5—5.

Further detail of the sub-chassis 65 is shown in FIGS. 3–7. The sub-chassis 65 is molded so that when the PIR sensor 20 is assembled, the volume between the Fresnel lens 35 and the PIR sensing element 115 is left vacant. This vacant chamber is indicated in the Figures by reference numeral 67. Referring to FIGS. 3–5, the vacant chamber 67 is bounded by a pair of horizontally extending funneling walls 85 and a pair of vertically extending funneling walls 87. Each of the walls 85 and 87 have front surfaces that are angled to converge toward the centrally located rear opening 80, as best seen in FIG. 3.

The funneling chamber 67 is completely sealed by the funneling walls 85 and 87, the seal between the gasket 116 and the sensor opening 80, and the seal between the front surface 66 of the sub-chassis 65 and the Fresnel lens 35. This seal prevents insects from getting inside the chamber 67 and adversely affecting the operation of the sensor 20, and also prevents air drafts from occurring within the chamber 67 which would also adversely affect the operation of the sensor 20.

Figure 6:
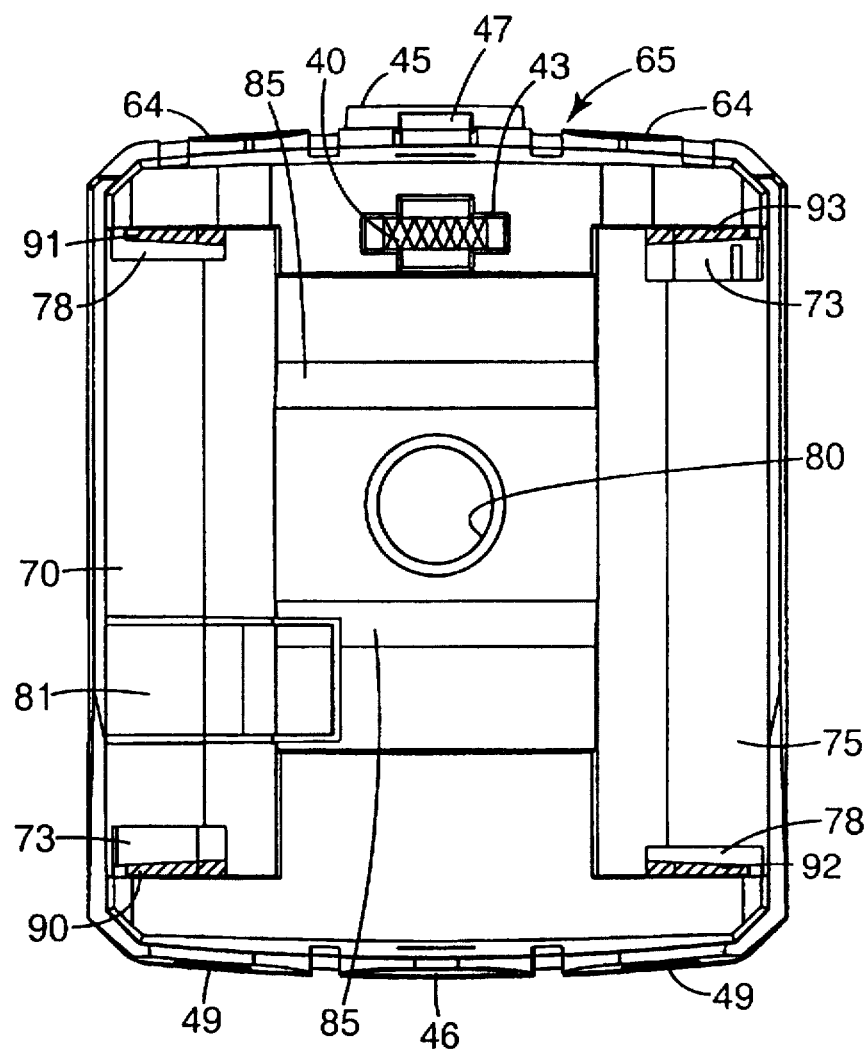
FIG. 6 is a back view of the sub-chassis shown in FIG. 4.

As shown in FIGS. 3 and 5, two vertically extending compartments 70 and 75 for AA-sized batteries 55 and 60 (FIG. 2) are on opposite sides of the sub-chassis 65. Referring to the cross-sectional view of FIG. 5, five side walls 160, 161, 162, 163 and 87 having a half octagonal cross-section define, in part, the battery compartments 70 and 75. Referring to FIGS. 2 and 5, it is seen that the batteries 55 and 60 are loaded into the battery compartments 70 and 75 from the sides. The battery compartments 70 and 75 are further defined by rearwardly extending floor portions 90 and 92 and ceiling portions 91 and 93. One of the floor portions 90 is shown in FIG. 3, and all of floor and ceiling portions 90, 91, 92 and 93 are shown in FIG. 6 which is the back view of the sub-chassis 65.

Figure 7:
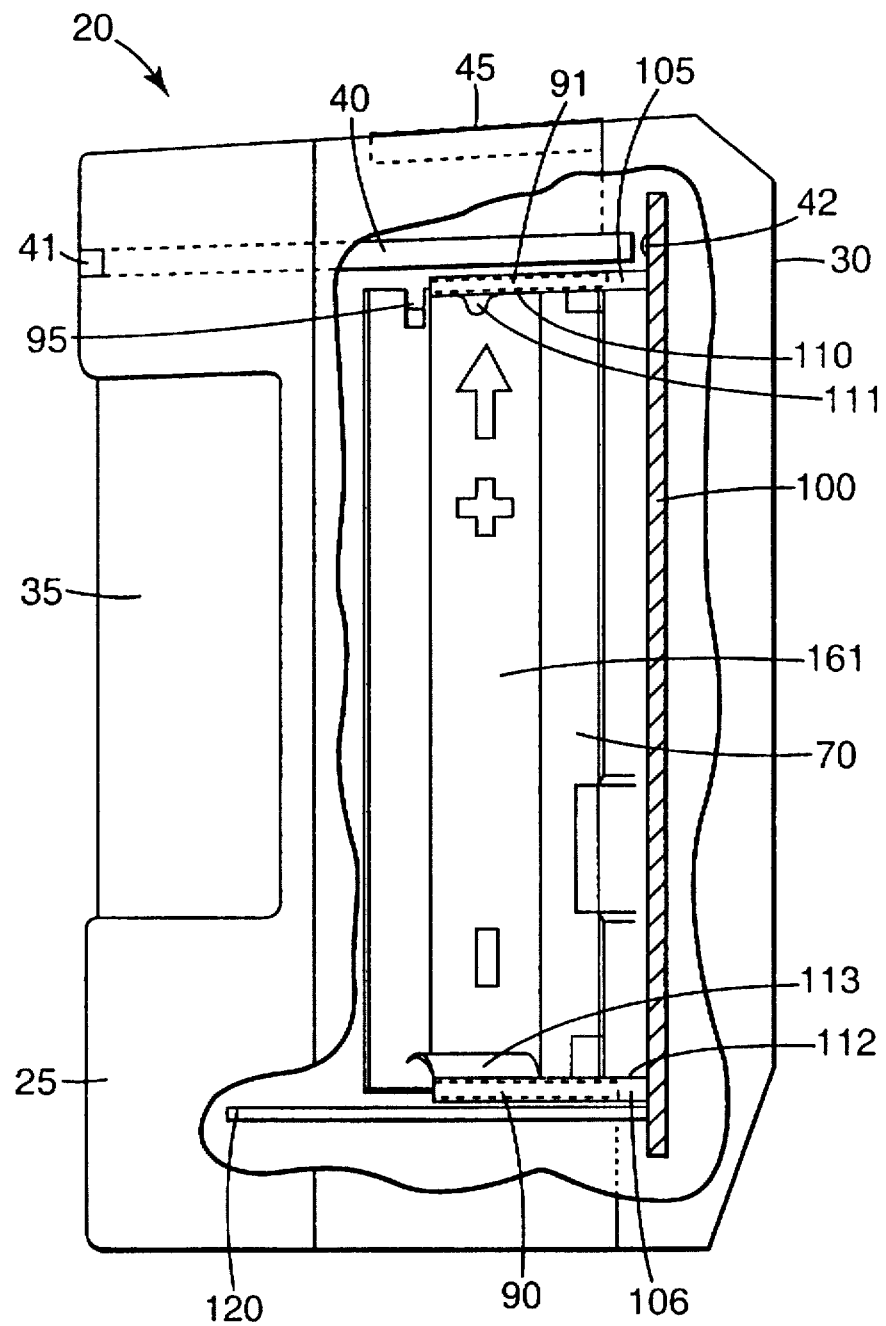
FIG. 7 is a side view of the PIR sensor shown in FIG. 1, with a breakaway section at a battery compartment.

Each battery compartment 70 and 75 has two holes 73 and 78 (FIG. 6), one on each end of its respective battery compartment 70 and 75. Holes 73 are slightly less than twice as high as holes 78. The forwardly extending battery contacts 105, 106, 107 and 108 of the PCB assembly 100, as shown in FIG. 3, each have a "U"-shaped cross-section. The "U"-shaped cross section allows the forwardly extending battery contacts 105, 106, 107 and 108 to be received about the rearwardly extending floor and ceiling portions 91, 90, 93 and 92 when the PCB assembly 100 is slid into the sub-chassis 65. To do this, the contacts 105, 106, 107 and 108 are first extended through the holes 73 and 78 in the rear of the battery compartments 70 and 75. For example, "U" shaped battery contact 106 slides through the hole 73 associated with floor portion 90. The other three "U" shaped battery contacts 105, 107 and 108 extend through the similarly configured holes 73 and 78 shown in FIG. 6. Referring now to only contact 106, the "U" configuration allows the contact 106 to slide through slit 72 (see FIG. 3) so that one leg 113 and 112 of the "U" is on the battery compartment 70 side of the rearwardly extending floor portion 90 while the other leg 117 of the "U" is on the opposite side of the rearwardly extending floor portion 90. The other three contacts 105, 107 and 108 slidably engage with their respective rearwardly extending floor and ceiling portions 91, 93 and 92 in similar fashion, until all four battery clips 105, 106, 107 and 108 encounter the ends of slits 72 and 77, and battery clips 105 and 108 encounter barriers 95 and 96 (barrier 95 being shown in FIG. 3). FIG. 7 is a cut-away view showing the PCB assembly 100, and more particularly two of the forwardly extending battery contacts 105 and 106 engaged with their respective rearwardly extending tabs 90 and 91 of the sub-chassis 65.

Battery contacts 105 and 108 are positive, and battery contacts 106 and 107 are negative. The battery-side surfaces 110 of the positive contacts 105 and 108 contain raised dimples 111 (shown in FIGS. 3 and 7) for contacting the positive terminals of the batteries 55 and 60. The battery-side surface 112 of the negative contacts 106 and 107 are split, with the front halves forming protruding convex tabs 113 which flex and hence are biased toward the negative terminal of the batteries 55 and 60 to ensure electrical contact.

The PIR sensor 20 shown in the figures is designed to use two AA-sized (for example, 1.5 Volt, alkaline batteries manufactured by Eveready® or Duracell®). The two batteries 55 and 60 may be connected in series to achieve a voltage of 3.0 Volts. The rating of two typical 1.5 Volt alkaline batteries in series would be approximately 2.5 AH. To minimize connection distance with the batteries in series configuration, one of the batteries 55 has its positive terminal facing upward while the other battery 60 has its positive terminal facing downward (see FIG. 2). As shown in FIG. 7, on wall 161 of the right-side battery compartment 70, battery orientation symbols, "+", "−" and "↑" are molded into the wall to aid the user in correctly loading batteries. The internal wall of the left-side battery compartment 75 is similarly marked, but in reverse. Barriers 95 and 96 prevent batteries 55 or 60 from being incorrectly loaded in the battery compartments 70 or 75 with their negative terminal oriented against the positive contacts 105 and 108. Therefore, reverse voltage protection is provided by physical means.

Alternatively, one set of battery contacts 105 and 106 could be connected in parallel with the second set of battery contacts 107 and 108, providing a parallel source to the circuitry on the PCB assembly 100. In this parallel configuration, a single 3.5 Volt, AA-sized, 2.1 AH rated, lithium thionyl chloride battery could be used, occupying only one of the battery compartments. To achieve more battery life, an additional 3.5 Volt, AA-sized lithium thionyl chloride battery could be used, occupying the other battery compartment.

As best seen in FIG. 5, the battery compartments 70 and 75 are positioned so that the majority of the volume of the batteries 55 and 60 is positioned directly rearward of the Fresnel lens 35. In other words, the majority of the battery volume is directly rearward of the vacant funneling chamber 67. In addition, the battery compartments 70 and 75 are forward of the PCB 101. Batteries 55 and 60 used with the PIR sensor 20, therefore, are housed in space that was not utilized in prior art PIR sensor designs, thus enabling a reduction in overall sensor size.

To replace the batteries 55 and 60, the primary assembly 150 is first removed from the back mounting plate 30 by depressing the button 45. Next, the primary internal assembly 140 is released from the front cover 25 as follows. The front cover 25 is grasped by one hand. The other hand grasps the primary internal assembly 140. Specifically, the middle and index finger of the other hand are placed on the upper tab portions 64 and depress them downward while the thumb is placed on the lower tab portion (not shown) and depresses it upward. This pinching action releases the upper holes 69 and the lower hole (not shown) from their respective front cover 25 internal catches (not shown). With the primary internal assembly 140 released from the front cover 25, the side battery compartments 70 and 75 are exposed. The user then is able to remove the old batteries 55 and 60 and replaces them with new, compatible AA-sized batteries. Then, the front cover 25 is reattached to the primary internal assembly 140, and the primary assembly 150 to the back mounting plate 30. Thus it is seen that battery replacement is fast, easy and efficient.

In the disclosed embodiment, the side-loading configuration for the battery compartments 70 and 75 allows easy access for battery replacement, without exposing the PCB assembly 100. Also, the side-loading configuration helps to enable the use of the space not previously used, by making feasible the positioning of batteries 55 and 60 rearward of the vacant funneling chamber 67 and forward of the PCB 101, while still providing for quick and easy battery replacement. Further yet, the side-loading configuration enables this particular configuration of the funneling walls 85 and 87 which form part of the seal of the vacant funneling chamber 67.

An LED 42 is mounted in a substantially central location near the top edge of the PCB 101. The LED light pipe 40 connects the LED 42 to the indicator opening 41 on the front cover 25 through the full depth of the PIR sensor 20, shown in FIG. 7, thereby projecting the light from the LED 42 to the outside. This LED light pipe 40 securely mounts to the inside surface of the sub-chassis 65 at the LED lens mounting 43 (shown in FIG. 6), and protrudes approximately ⅛ inch from the inner molding front surface 66 (shown in FIG. 3) in order to mate with the indicator opening 41 on the front cover 25.

An antenna 120, constructed of a formed wire of suitable conductive material, is soldered to the PCB 100 as shown in FIGS. 3 and 7. The antenna 120 extends under the battery compartments 70 and 75 and into the sub-chassis 65, when the PCB assembly 100 is engaged with the sub-chassis 65. Therefore, the antenna 120 requires no additional space within the PIR 20, complementing the overall size reduction of the present invention.

Other embodiments are within the scope of the claims. For example, the battery compartments 70 and 75 may be above and below the funneling chamber 67, instead of to the sides. The PIR sensor 20 may use smaller batteries, perhaps even a single ½ AA battery, and provide for their placement in accordance with the invention. Also, the PIR sensor 20 may have a larger focal length and hence a larger vacant funneling chamber, and may utilize physically larger batteries (for example, size D). Hard-wired sensors having a back-up local battery source may utilize the battery placement in accordance with the invention. Finally, the invention may apply to other sensors, such as sensors for sensing microwaves or ultrasonic waves.

What is claimed is:

1. A security system sensor comprising:
   a lens lying in a forward plane for focusing received energy to a focal point rearward of the forward plane;
   a sensing element having a forward surface located substantially at the focal point of the lens, the sensing element defining a rearward plane that is immediately rearward of the sensing element and parallel to the forward plane of the lens, the and the sensing element defining a funnel-shaped chamber that is substantially vacant and encompasses the volume between the lens and the forward surface;
   a battery housing positioned such that a battery power source contained therein has the majority of its volume rearward of the funnel-shaped chamber and forward of the rearward plane; and
   wherein the security system sensor has a volume of about 15 cubic inches or less.

2. The sensor of claim 1, wherein the sensor is a PIR sensor, the lens is a Fresnel lens, and the sensing element is a PIR sensing element.

3. The sensor of claim 1, further comprising a dividing barrier interposed between the funnel-shaped chamber and the battery power source, wherein the dividing barrier extends to and seals with the sensing element and the lens, to seal the funnel-shaped chamber.

4. The sensor of claim 1, wherein the battery housing comprises at least two separate battery compartments.

5. The sensor of claim 4, wherein the battery compartments are each sized to house a battery that is at least as large physically as a AA-sized battery.

6. The sensor of claim 5, wherein the sensor is electrically configured such that batteries housed in the battery compartments are electrically connected in series.

7. The sensor of claim 5, wherein the sensor is electrically configured such that batteries housed in the battery compartments are electrically connected in parallel, and wherein the sensor is operable with either one or two batteries installed.

8. The sensor of claim 1, further comprising a printed circuit board lying in the rearward plane and upon which the sensing element is mounted.

9. The sensor of claim 8, further comprising electrical contacts mounted on the printed circuit board and extending within the battery holder, the contacts providing electrical connection to terminals of the battery power source.

10. The sensor of claim 1, wherein the battery housing includes a barrier to prevent a battery from being loaded in the battery housing in a reverse-polarity configuration.

11. A wireless PIR sensor comprising:

a forwardly bowing Fresnel lens lying in a forward plane for focusing received PIR energy to a focal point rearward of the forward plane;

a PIR sensing element having a forward surface located substantially at the focal point of the Fresnel lens, the PIR sensing element defining a rearward plane that is immediately rearward of the PIR sensing element and parallel to the forward plane of the Fresnel lens, the Fresnel lens and the PIR sensing element defining a funnel-shaped chamber that is substantially vacant and encompasses the volume between the Fresnel lens and the forward surface; and a battery housing positioned such that a user-replaceable battery power source contained in the battery housing has the majority of its volume rearward of the funnel-shaped chamber and forward of the rearward plane.

12. The wireless PIR sensor of claim 11, wherein the sensor has a volume of about 15 cubic inches or less.

13. The wireless PIR sensor of claim 12, wherein the battery housing comprises two battery compartments, each compartment sized to house a battery that is at least as large physically as a AA-sized battery.

14. A wireless PIR sensor comprising:

a housing comprising a front cover and a back mounting plate mateable with one another, the front cover having a bowed front surface with an opening over which a Fresnel lens is mounted, the Fresnel lens for focusing PIR energy toward a focal point internal to the housing;

a PIR sensing element having a forward surface located substantially at the focal point of the Fresnel lens; and a sub-chassis contained within the housing, the sub-chassis having a funnel-like configuration with a front opening facing and corresponding in size to the Fresnel lens and a rear opening providing access and corresponding in size to the PIR sensing element, wherein the sub-chassis in combination with the Fresnel lens and the PIR sensing element forms a sealed chamber.

15. The wireless PIR sensor of claim 14, further comprising a gasket encircling the PIR sensing element to form the seal between the sub-chassis and the PIR sensing element.

16. The wireless PIR sensor of claim 14, wherein the sub-chassis includes at least two battery compartments.

17. The wireless PIR sensor of claim 16, wherein the battery compartments in the sub-chassis are positioned at the sides of the sub-chassis, and wherein access to the battery compartments is obtained from the sides of the sub-chassis.

18. The wireless PIR sensor of claim 17, wherein the battery compartments are sized to accommodate two AA-sized batteries.

19. The wireless PIR sensor of claim 16, wherein the battery compartments are positioned such that the majority of the volume of a battery source contained in the battery compartments is directly rearward of Fresnel lens and forward of a rearward plane that is immediately rearward of the PIR sensing element.

* * * * *